H. C. SAMPSON & A. F. FARMAN.
EMERGENCY RIM.
APPLICATION FILED JAN. 4, 1916.
1,232,981. Patented July 10, 1917.
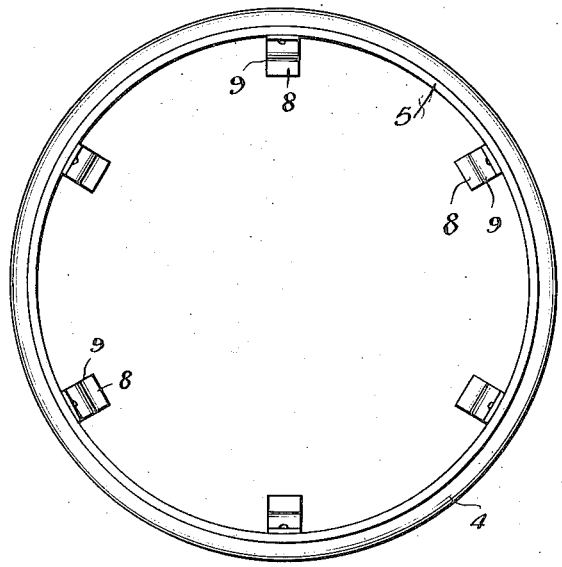
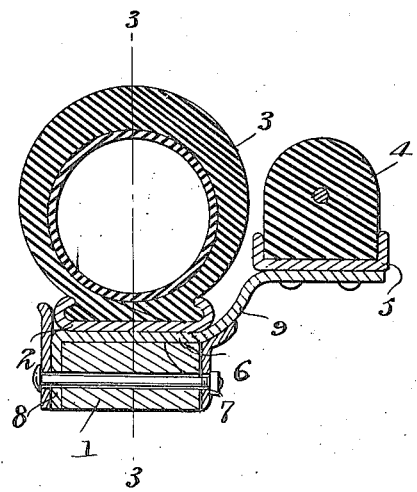
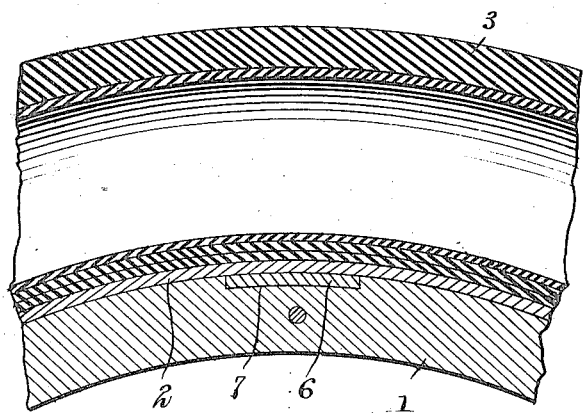
Witnesses
Fredrick W. Ely.
P. M. Smith.
Inventor
H. C. Sampson,
A. F. Farman,
By Victor J. Evans
Attorney

UNITED STATES PATENT OFFICE.

HENRY C. SAMPSON, OF SAN FRANCISCO, AND ARTHUR F. FARMAN, OF OAKLAND, CALIFORNIA.

EMERGENCY-RIM.

1,232,981.            Specification of Letters Patent.      Patented July 10, 1917.

Application filed January 4, 1916. Serial No. 70,092.

*To all whom it may concern:*

Be it known that we, HENRY C. SAMPSON and ARTHUR F. FARMAN, citizens of the United States, residing at San Francisco and Oakland, respectively, in the counties of San Francisco and Alameda and State of California, have invented new and useful Improvements in Emergency-Rims, of which the following is a specification.

This invention relates to emergency rims and tires for vehicle wheels being especially adapted for use in combination with a pneumatic tire so that in the event of the puncturing or blowing out or collapse of the pneumatic tire, the emergency tire will be used to support the load thereby preventing any further or additional injury to the pneumatic tire until a place of repair is reached. The emergency tire also operates to prevent a punctured or collapsed pneumatic tire from rolling off the rim or felly of the wheel and is also useful when the machine is stored for a long period of time to take the weight off the pneumatic tires thereby increasing the life and durability of the latter.

With the above and other objects in view, the invention consists in the novel construction, combination and arrangement of parts, as herein described, illustrated and claimed.

In the accompanying drawings:—

Figure 1 is a side elevation of an emergency rim and tire embodying the present invention.

Fig. 2 is an enlarged cross sectional view, showing the emergency tire, rim and retaining means, in the relation thereof to the vehicle wheel felly and the main pneumatic tire and its rim.

Fig. 3 is a vertical longitudinal section on the line 3—3 of Fig. 2.

Referring to the drawings 1 designates the felly of a vehicle wheel such as is now commonly employed for automobiles, motor trucks and the like, the felly 1 being encircled by a main tire carrying rim 2 shown as equipped with an ordinary pneumatic tire 3.

In carrying out the present invention I provide an emergency tire 4 which is preferably of rubber and solid in cross section so that it is not liable to collapse, the tire 4 being carried by an emergency rim 5. In order to secure the rim 5 in firm and fixed relation to the main rim 2 and the felly 1, the emergency rim 5 is provided at intervals with retaining means shown in the form of arms extending laterally therefrom and each embodying a substantially straight body portion 6 which is inserted between the felly 1 and the rim 2 and which preferably lies in a recess or seat 7 formed in the outer face of the felly so as not to interfere with the main rim 2, permitting the latter to rest upon and come in contact with the felly 1.

Each arm is provided at one end with an inwardly extending stop lip or extension 8 which bears against one of the side faces of the felly 1 as shown in Fig. 2 thereby preventing the arm from moving in one direction laterally of the wheel. At the opposite side of the wheel each arm is provided with an outwardly extending stop lip or portion 9 which bears against the adjacent side or flange of the main rim 2. Therefore, the main rim 2 acts to clamp all of the arms of the emergency rim against the felly of the wheel.

The arms which support the emergency rim are so constructed and proportioned that the tread surface of the emergency tire 4 will normally lie inside of the corresponding tread surface of the pneumatic tire 3 thereby enabling the last named tire to perform its usual function. When, however, the pneumatic tire 3 collapses from any cause whatever, the load of the vehicle and its occupants is immediately transferred to the emergency tire 4 thereby preventing any additional or further injury to the pneumatic tire until a place of repair is reached.

Where the main rim 2 is of the demountable type, it will be readily understood that by removing such demountable rim, the emergency rim may be placed in proper position in relation to the felly of the wheel and then when the demountable rim 2 is placed upon the felly and fastened thereon by any suitable means such as now commonly employed, the demountable rim will serve to securely clamp the emergency rim in fixed relation to the felly. By reversing the operation, the emergency rim with its tire may be easily removed from the wheel.

Having thus described our invention, we claim:—

The combination with the felly of a vehicle wheel, of a main tire-carrying rim encircling said felly and supported directly thereby, a pneumatic tire on said rim, an emergency tire-carrying rim arranged at the outer side of the main rim, and comprising supporting arms arranged at intervals throughout the length thereof and each extending through a mortise in the felly under and transversely of the main rim and embodying an inwardly extending lip which bears against the side face of the felly opposite the emergency rim, and means for securing the main rim and said supporting arms in fixed relation to the felly.

In testimony whereof we affix our signatures in presence of two witnesses.

HENRY C. SAMPSON.
ARTHUR F. FARMAN.

Witnesses:
   FRED L. BUTTON,
   E. H. BUTTON.